United States Patent [19]

Drechsel

[11] 4,421,279
[45] Dec. 20, 1983

[54] ARTICULATED COUPLING PARTICULARLY FOR ADJUSTING THE JET INCLINATION OF IRRIGATORS IN GENERAL

[76] Inventor: Arno Drechsel, Via Weggenstein, 29, 39100 Bolzano, Italy

[21] Appl. No.: 256,237

[22] Filed: Apr. 21, 1981

[30] Foreign Application Priority Data

May 23, 1981 [IT] Italy ................................ 46840 A/80

[51] Int. Cl.³ ............................................ B05B 15/08
[52] U.S. Cl. ................................. 239/546; 285/184
[58] Field of Search ......... 239/546, 587, 588, DIG. 1; 285/184, 181

[56] References Cited

U.S. PATENT DOCUMENTS

| | | | |
|---|---|---|---|
| 960,899 | 7/1910 | Guyer | 285/184 |
| 1,067,516 | 7/1913 | Gleeson | 285/184 |
| 3,737,179 | 6/1973 | White, Jr. | 285/184 |
| 4,163,571 | 8/1979 | Nash | 285/184 |

*Primary Examiner*—James B. Marbert
*Attorney, Agent, or Firm*—Brisebois & Kruger

[57] ABSTRACT

The invention concerned relates to an articulated coupling particularly for adjusting the jet inclination of irrigators in general, comprising two curved or straight consecutive tubular members in constant direct communication with each other, which, at their facing contacting mouths, comprise profiled ends arranged to enable them to be mutually adjusted angularly about a diametrical axis of articulation; seal means disposed on the inside of said mouths and arranged to automatically adapt to said adjustment; an adjustment device for said two tubular members, the control member of which lies in the mutual swivel plane of these latter; and a guide and connecting clamp for the tubular members, the longitudinal axis of which coincides with the axis of articulation of the coupling.

10 Claims, 4 Drawing Figures

ARTICULATED COUPLING PARTICULARLY FOR ADJUSTING THE JET INCLINATION OF IRRIGATORS IN GENERAL

This invention relates to an articulated coupling constructed in such a manner as to allow extremely simple and rapid adjustment of the jet inclination of irrigators when these latter are in operation.

The use of irrigators in general during windy days or windy zones is well known to present difficulties due to the need to adjust the height of the jet in order to prevent the wind varying the water distribution uniformity, so making irrigation practically ineffective.

This results in the fact that at the present time during windy days, such installations are practically unusable or at least result in water losses, deviation of the jet towards unrequired zones, and poor water distribution in the zones to be irrigated.

This upsets the scheduled irrigation periods by lengthening them and preventing the use of the installation to be programmed in accordance with normal rotation.

It is also a known fact that at the present time during said windy days or in said windy zones, required optimum adjustment of the jet inclination of known irrigators cannot be achieved.

In this respect it is apparent that the higher the jet, the more it becomes influenced by the wind, whereas the lower the jet the less it becomes influenced by the wind.

Consequently, for every wind speed, which can also vary many times during the same day, there is an optimum ideal angle of elevation or inclination for the jet in order to obtain maximum projection of this latter.

For this reason, in the specific field there is a deeply felt need for a device which can be fitted to any type of irrigator to enable the jet inclination to be adjusted with the relative irrigator in operation, so as to obtain effective irrigation even in the presence of wind.

In this respect, if the irrigator inclination can be continuously adjusted while in operation, the jet becomes adapted to every wind condition without having to interrupt irrigation.

For example, it is well known that the wind decreases during the night, and thus the jet inclination can be increased, so increasing the wetted surface area.

The main object of the present invention is to provide an articulated coupling for irrigators in general, which, by means of a single, rational and highly reliable structure, satisfies said requirements in that it allows extremely simple or rapid adjustment of the jet inclination of the corresponding irrigator even when this latter is in operation.

According to the invention, this object is attained by providing an assembly consisting of elements which can be mutually adjusted angularly, and which is composed of two curved or straight consecutive tubular members in direct continuous communication with each other, and designed to be connected into the feed column, into the propelling tube or at the bend which connects said column to the tube of the relative irrigator.

According to the invention, the two adjacent ends of said consecutive tubular members are of cusp configuration, with the cusp in a position corresponding with the diameter so that said two cusps, which face each other and are associated with means disposed laterally to the tube for ensuring the consistency of the assembly, constitute the axis of articulation of a hinge.

Moreover, said two facing ends are associated internally with a single seal member with a non-stable operating position, i.e. adaptable to the relative position assumed by the two tubular member, whereas orthogonally to said axis of articulation there is provided a screw-nut screw or other mechanically equivalent device which rigidly connects together said two tubular members to allow their mutual adjustment.

In the light of this, it is easily apparent that such a coupling is extremely rigid in a lateral direction and free from any slack, this being the essential requirement in order to correctly transmit the impulses of the thrust deflector disposed at the free end of the propelling tube, to the bearing disposed between this latter and the irrigation water feed column.

The merits and constructional characteristics of the invention will be more apparent from the detailed description given hereinafter with reference to the figures of the accompanying drawings which illustrate a preferred embodiment thereof by way of non-limiting example only.

Figure 1:
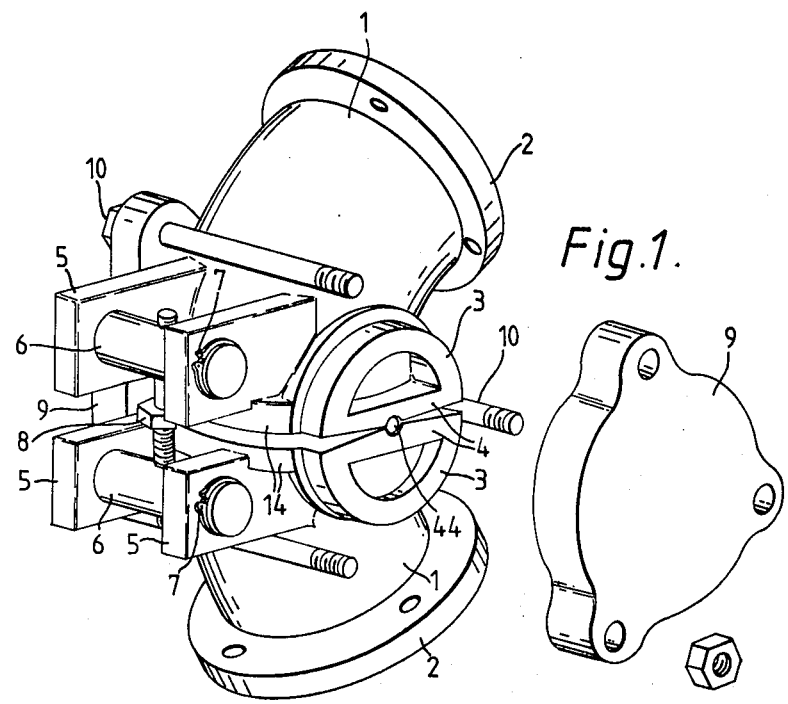
FIG. 1 is a partly exploded perspective front view of the invention.

Said figures, and in particular FIG. 1, show two curved tubular members 1 of circular cross-section, which have the same average radius of curvature.

Said two curved tubular members 1 are disposed one following the other so that they are in constant communication with each other.

For this reason, the pair of tubular members 1 is arranged to define an elbow or curve designed to be connected between an irrigation water feed column and a propelling tube of an irrigator of known type.

At this point it is also apparent that the tubular members 1 could be straight to enable them to be connected into said irrigation water feed column, or between the feed column and the elbow which connects this latter to the propelling tube, or again between said elbow and the said propelling tube, or into this latter.

According to the invention, the outer mouth of each curved tubular member 1 is provided with an outer circumferential flange 2 comprising a suitable set of through orthogonal bores and designed to be connected to the corresponding element of the irrigator which is to be equipped with the present invention.

The inner mouths of the two tubular members 1, i.e. the two mouths of the invention which face each other, each comprise a circumferential projecting rib 14 substantially of cup shape.

In proximity to said ribs 14, from the surface of each tubular member 1 there branches a pair of parallel brackets 5, disposed symmetrically about the plane in which the pair of tubular members 1 lies.

A pin 6 is rotatably mounted on the free ends of each pair of brackets 5, and is locked axially relative to said brackets 5 by means of a pair of external Seeger or snap rings 7.

It is apparent that said pin 6 can comprise an enlarged head at one end, whereas at the other end it is provided with a Seeger ring as stated heretofore.

Into the central zones of the pair of pins 6 there are screwed the two opposing ends of a threaded spindle 8, which is provided centrally with an operating nut, its two opposing ends comprising two opposite handed threads.

Figure 2:
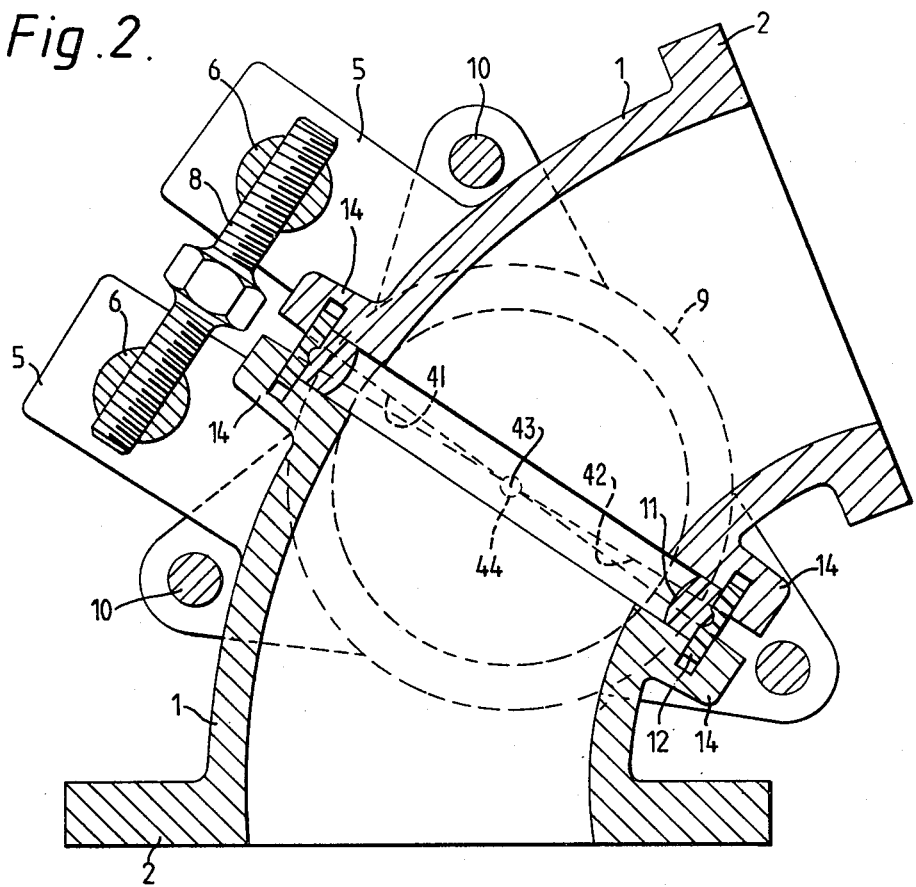
FIG. 2 is an axial section through the invention on its adjustment plane.

Even though not stated heretofore, from said FIGS. 1 and 2 it will be apparent that the aforesaid adjustment unit is located in that part of the invention having the greatest radius of curvature, i.e. the adjustment device is disposed external to the invention.

It will also be apparent that the plane in which the threaded spindle 8 lies coincides with the plane in which the axes of the tubular members 1 lie and/or in which they are adjusted.

The cup-shaped ribs 14 each comprise two flat chamfers 41, 42 which for each of them define a diametrical cusp having an apex axis 43 at the axis of pins 44.

The two diametrically facing cusps define the diametrical axis of articulation of the articulated joint or coupling.

Two substantially semicircular rims 3 branch from each rib 14 at the ends of said diameter.

Said rims 3 define, in pairs, two circular pads at the ends of the axis of articulation and having their centre thereon, these being designed to be enclosed in two lateral covers 9, which ensure the consistency of the articulated joint.

The two covers 9 are connected together by three tie rods 10 parallel to the axis of articulation, and exert a guiding action on the two parts of the joint by virtue of the fact that their inner wall has a diameter substantially equal to the outer diameter of the rims 3.

The tie rods 10 clearly keep the two covers 9 in contact with the rims 3 but without clamping them together, so as to enable them to move relatively.

Finally, the two rims 3 lie in the same plane, and are each diametrically connected to a base 4 which also lies in said plane and is provided with the same chamfers as the cup-shaped rib 14 from which it branches.

Figure 3:
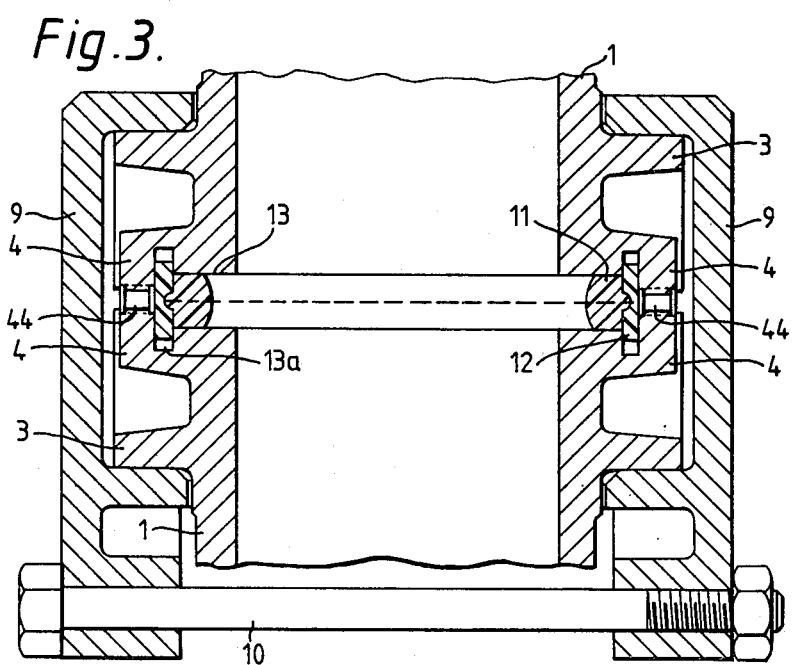
FIG. 3 is a partial section therethrough on a plane orthogonal to the preceding.

As is apparent from FIGS. 1 and 3, suitable semicylindrical seats of different cross-sections are provided on the pointed parts of each pair of bases 4, and are arranged to receive a pin 44, which is provided at its other end with an enlarged head.

On the inside of the circumferential rib 14 of each tubular member 1, i.e. at the inner mouth thereof, there is a widened shoulder 13 which, in combination with the identical widened shoulder of the other tubular member 1, defines an annular chamber housing a gasket of elastic material 11, as shown in FIG. 3, on the outside of which and concentrically thereto there being provided an anti-extrusion ring 12.

From the same figure it can also be seen that the most outer part of each enlarged shoulder 13 comprises an underlying channel 13a.

Moreover, the width of the anti-extrusion ring 12 is less than the corresponding dimension of the annular housing defined by the two underlying channels 13a, so that said ring enables the two tubular members 1 to be mutually adjusted angularly as it can slide inside said annular housing during said adjustment.

The anti-extrusion ring is preferably rigid, but can also be formed from a flat annular ring of soft rubber.

Finally, from the accompanying FIGS. 2 and 3 it will be noted that the two tubular members 1 are shown in their intermediate adjustment position, so that the gasket 11 is slightly compressed along its complete circumferential extension.

Said compression is necessary in order to ensure sealing of the invention when the tubular members 1 assume an adjustment position different from that shown.

Figure 4:
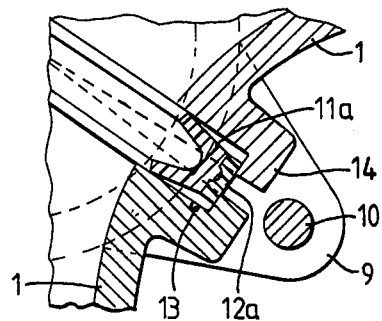
FIG. 4 is a partial axial section similar to that of FIG. 2, showing an alternative embodiment for the seal member with which the invention is provided.

The seal member of the invention can also have a configuration of the type shown in FIG. 4.

In this specific case, said seal member is in the form of a double lip gasket 11a which rests in the annular chamber defined by the enlarged shoulders 13 provided at the facing mouths of the tubular members.

In this case, the underlying channels 13a are not provided, and externally to the double lipped gasket 11a there is disposed an anti-extrusion ring 12a, the length of which is less than the corresponding dimension of said annular chamber.

When it is required to vary the relative position of the two tubular members 1 in one direction or the other, it is necesary only to rotate the threaded spindle 8 in one direction or the other so that it either screws into or screws out of the two pins 6.

Lastly, it is apparent that correct mutual adjustment of the two tubular members 1 is made possible by the presence of the cylindrical covers 9 and pins 44 which act as guide members for said tubular members, and by the advantageous idle mounting of the pins 6 relative to the brackets 5 so that said pins 6 can take-up the relative rotation which takes place between the various elements making up the coupling according to the invention.

It will be apparent that during said adjustment state, the gasket 11, 11a and the respective anti-extrusion ring 12, 12a become automatically matched to the new positions which are assumed by the two tubular members 1.

It should also be noted that with a coupling constructed in this manner, it is possible to adjust the jet inclination of an irrigator equipped with the invention even when the irrigator is operating, in that the present coupling in practice does not become locked by the pressure inside it.

This fact is extremely advantageous, because it allows visual determination of when the jet assumes the required inclination.

Furthermore, another great advantage of the invention is the fact that such a coupling, which is easily adjusted about its diametrical axis of articulation, is extremely rigid, i.e. is free from any slack between the elements which comprise it, this being the essential or basic requirement for correctly transmitting the impulses of the thrust deflector disposed at the free end of the propelling tube to the bearing disposed between this latter and the irrigation water feed column.

Finally, the cross-section of the tubular members 1 need not necessarily be circular, but can be of any other shape.

The invention is not limited to the single embodiment heretofore described, and modifications and improvements can be made thereto without leaving the scope of the inventive idea, the fundamental characteristics of which are summarised in the following claims.

I claim:

1. An articulated coupling for adjusting the jet inclination of irrigators comprising two tubular members in constant direct communication with each other for feeding liquid to an irrigator discharge nozzle, and tubular members comprising, a first tubular member having an end, and a second tubular member having an end, said end of said first tubular member being profiled and comprising a cusp-shaped end face having an apex axis at a diameter of said end, surfaces of said cusp-shaped end face on opposite sides of said apex being chamfered to converge toward said apex axis and being in opposed facing relation to an end face of said second tubular member, coupling means connecting said tubular members together for pivotal movement with respect to each other about a fixed axis corresponding essentially to said apex axis, from a first position in which surfaces of the end faces of the tubular members on one side of the apex axis engage each other, deformable seal means adjacent said end faces for sealing said ends throughout movement between said first and second positions, and adjustment means externally of and connected between said tubular members for selectively pivoting said tubular members about said fixed axis to any selected position between said first and second positions, while liquid is flowing through said tubular members, said adjustment means including means for maintaining said tubular members at the selected position of adjustment.

2. A coupling according to claim 1 wherein said end face of said second tubular member comprises a cusp-shaped end face which is a mirror image of the cusp-shaped end face of said first tubular member.

3. A coupling as claimed in claim 1 further comprising a counterbore in each of said ends of said first and second tubular members, and wherein said seal means comprises an elastic annular seal in said counterbores.

4. A coupling according to claim 3 wherein said elastic annular seal comprises a double lip resilient gasket.

5. A coupling according to claim 3 further comprising an axially opening groove in each of said ends of a diameter greater than said counterbores, and an anti-extrusion ring surrounding said seal and extending into said grooves.

6. A coupling according to claim 1 wherein the chamfered surfaces of the cusp-shaped end face on opposite sides of said apex axis comprise flat surfaces.

7. A coupling according to claim 1 further comprising pivot pins between and engaged by said ends of said tubular members, said pins having aligned axes lying along said fixed axis and being located respectively on opposite sides of said members.

8. A coupling according to claim 1 wherein said adjustment means comprises a threaded element in a plane perpendicular to said fixed axis and passing through center axes of the tubular members.

9. A coupling according to claim 1 wherein said coupling means comprises a first pair of bosses aligned with each other and fixed on opposite sides respectively of said first tubular member, a second pair of bosses aligned with each other and fixed on opposite sides respectively of said second tubular member, said bosses each having a surface of the same radius curving arcuately about said fixed axis, a circular bearing extending around the bosses at each side of the tubular members, and means for retaining said bearings on said bosses.

10. A coupling according to claim 1 wherein said tubular members are identical to each other.

* * * * *